United States Patent [19]

Wason et al.

[11] Patent Number: 5,138,583
[45] Date of Patent: Aug. 11, 1992

[54] NOISE ATTENUATION METHOD

[75] Inventors: Cameron B. Wason; David J. Monk, both of Plano; Robert G. McBeath, Richardson, all of Tex.

[73] Assignee: Halliburton Geophysical Services, Inc., Houston, Tex.

[21] Appl. No.: 704,231

[22] Filed: May 22, 1991

[51] Int. Cl.$^5$ .............................. G01V 1/32
[52] U.S. Cl. ....................... 367/38; 367/21; 364/421
[58] Field of Search ............ 367/21, 24, 38, 63; 364/421

[56] References Cited

U.S. PATENT DOCUMENTS

| | | | |
|---|---|---|---|
| 3,398,396 | 8/1968 | Embree | 367/46 |
| 4,628,492 | 12/1986 | Winney | 367/63 |
| 4,760,563 | 7/1988 | Beylkin | 367/73 |
| 4,779,238 | 10/1988 | Howard | 367/63 |

OTHER PUBLICATIONS

Articles: "Part 1 & 2—Noise Elimination & Radon Transform by B. Russell, D. Hampson & J. Chun, Oct. 1990 & Nov. 1990 Geophysics: The Leading Edge of Exploration".
Article: "Interactive Median Stack" by O. E. Naess & L. Bruland.
Articles: "Slant Stacks & Intervals of Optimum Stacking", by Raul Estevez, SPE 11, pp. 157-166, 1977 and Variable Velocity Anti-Aliasing Window for Slant Stacking, by William Gray, SPE 13, pp. 84-89, 1977.

Primary Examiner—Ian J. Lobo

[57] ABSTRACT

A method for attenuating coherent and incoherent noise in seismic signal data is provided. Seismic signal data is transformed from a time-space domain using a Radon-transform domain. In the Radon-transform domain, coherent noise is attenuated by muting and incoherent noise is attenuated by diversity stacking. Data remaining in the Radon-transform domain in transformed back to the time-space domain by an inverse Radon transform.

19 Claims, 7 Drawing Sheets

PROCESS FLOW DIAGRAM

PROCESS FLOW DIAGRAM

PROCESS FLOW FOR DIVERSITY RADON PROCESS

PROCESS FLOW FOR MUTING COHERENT NOISE

INPUT
TIME-SLOPE
DATA

RADON
TRANSFORM — 43

OUTPUT
TIME-DISTANCE
DATA

PROCESS FLOW AND
DATA DIAGRAMS FOR
INVERSE RADON TRANSFORM

INPUT DATA RECORD

DATA RECORD AFTER
ATTENUATION OF
COHERENT AND
INCOHERENT NOISE

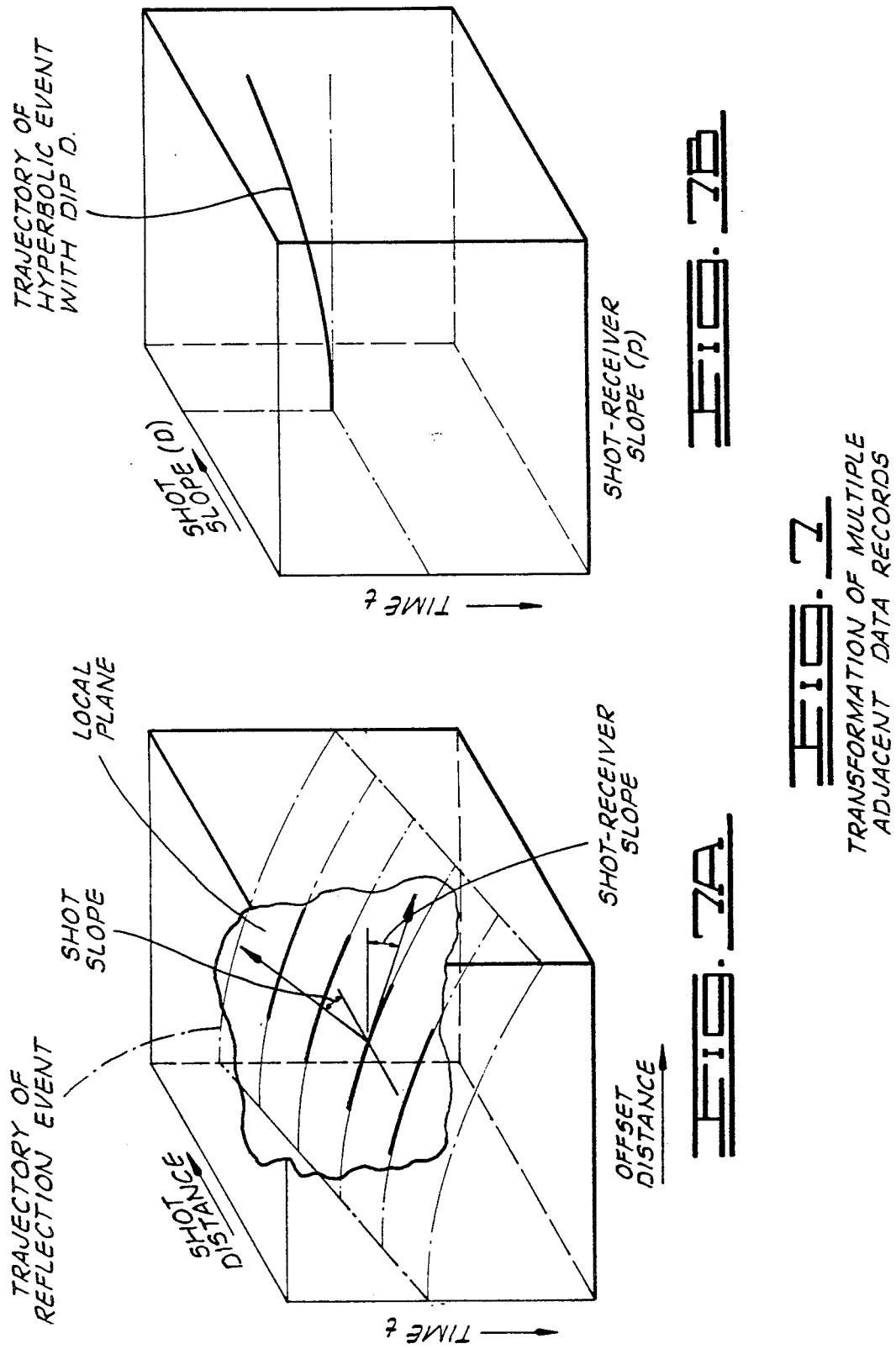

NOISE ATTENUATION METHOD

FIELD OF THE INVENTION

This invention relates to methods for attenuating noise in a signal. More particularly, but not by way of limitation, the present invention relates to methods of attenuating noise in seismic signal data. The methods disclosed in this invention attenuate both coherent noise and in-coherent noise.

DESCRIPTION OF THE PRIOR ART

Generally, noise is classified as either coherent or incoherent. Coherent noise is interference that is organized in space and time. In the seismic environment, coherent noise often represents reflected energy that originates outside the zone being imaged by the seismic experiment.

Incoherent noise is interference that has no organization in space or time. In the seismic environment, incoherent noise is associated with cultural noise and background noise, such as for example noise generated by pump and vehicle operation.

Methods for suppression of noise fall into three major categories; (i) data stacking or summation, (ii) transformation and muting, and (iii) filtering. Stacking is generally recognized as an effective way of dealing with incoherent noise. Most stacking techniques utilize a mean average of sample values over a data set in which the signal is consistent. Stacking techniques using median averages are often effective for attenuating incoherent noise. A more effective stacking technique for attenuation of incoherent noise employs a diversity power stack. Diversity power stacking is accomplished by prescaling the data by the inverse of its local power value prior to summation. The scalers are summed and averaged, and the average scaler value is removed from the weighted average of the data.

In the transformation and muting method, the data is transformed to a domain in which the signal and coherent noise occupy discrete areas therein. Once segregated into discrete areas, coherent noise can be "zeroed-out" or muted leaving the desired signal which is inverse transformed back to the original domain. As an example of a simple muting procedure, coherent noise is muted directly on the time-offset, or t-x domain, data. In another example, coherent noise with a specific dip or velocity is attenuated by first transforming the data from the t-x domain to the frequency-wave number (f-k) domain. In the frequency-wavenumber domain, the coherent noise occupies an area discrete from the area occupied by the desired signal. In this way, the coherent noise can be selectively muted leaving the signal to be inversed transformed to the original domain.

Another useful transformation is the Radon transform. In this transformation the data is mapped to a time-dip domain or a time curvature domain. Generally, in either of these domains, coherent noise with specific dips or curvature can occupy areas discrete from the areas occupied by the signal and hence can be muted.

However, the ability of these transformation and muting methods to effectively attenuate incoherent noise is limited. The transformation procedures, described above, do not isolate incoherent noise into discrete areas. Therefore, the muting process is ineffective for removing this class of noise.

The filtering method assumes that noise can be distinguished from the desired signal by differences in the respective frequencies. As such, filtering is generally effective only in situations where there exists an appreciable difference in frequencies between the desired signal and the noise.

SUMMARY OF THE INVENTION

The present invention provides an improved technique for the attenuation of noise in signals, particularly seismic signal data. The method of the present invention produces significant attenuation of both coherent and incoherent noise by selectively combining data stacking concepts and transformation/muting concepts. The method uses a Radon transform to convert the data into a domain in which the coherent noise and signal are isolated and hence the coherent noise can be muted. Attenuation of incoherent noise is achieved by performing a diversity stack, which is sometimes referred to as diversity summation, in concert with the Radon transform process.

The Radon transform is performed as a summation or mean along time-distance trajectories. The summation procedure may utilize a data amplitude diversity Radon transform procedure or, more preferably a power diversity Radon transform procedure. Using the preferred power diversity Radon transform procedure, each point on the trajectory contributing to the mean is prescaled by the reciprocal of the local power in each trace. The scalers are meaned along the same trajectory. The final summation output is defined as the mean of the scaled values divided by the mean of the scalers. In this way, if one contributor to the mean is large due to incoherent noise, that value is scaled down and does not significantly contribute to (i) the prescaled data mean and (ii) the mean of the scalers. Hence, the recovered scaled output appears as though the incoherent noise component was not included in the data mean. In this process prescalers are required that are the reciprocal of the local power in each trace at time (t) and space distance (x). These scalers are computed as the time local mean of the power in that trace.

Additionally, the Radon transformation may assume that the signal and coherent noise can be represented as an ensemble of either linearly dipping events, parabolic events or hyperbolic events. For each of these event trajectories, the Radon transformation is implemented as a summation along the appropriate trajectories. For example, if the coherent noise is represented in the time-distance (t-x) domain by linearly traveling noise then a Radon transformation based on decomposing the data into linear dip components is the preferred transformation. Such a choice is preferred for attenuating linearly propagating ground roll. However, if the coherent noise has a time-space trajectory that is parabolic or hyperbolic, then a Radon transform based on decomposing the data into parabolic or hyperbolic components is the preferred transformation. The hyperbolic choice is preferred where the coherent noise is reflected energy in the form of scattered energy from obstacles that are broadside to the seismic survey line.

Attenuation of incoherent noise is achieved during the summation in the Radon transform by performing a diversity stack or summation in concert with the Radon transform process. When the Radon transform is performed assuming linearly dipping events, it is often referred to as a slant stack. In these circumstances, the preferred technique is to limit the aperture of data in the t-x domain that contributes to a dip or slant summation.

Once the data have been Radon transformed using the diversity summation procedure and both coherent and incoherent noises are attenuated, an inverse transform is performed to convert the data back to the original domain. The preferred inverse transform is the inverse Radon transform. However, if an inverse Radon transform is used, a standard summation method is required instead of a diversity summation method.

DESCRIPTION OF THE DRAWINGS

FIG. 7a illustrates a series of records for each shot for a particular reflective event.

FIG. 7b illustrates the transformation of the slope of the records shown in FIG. 7a.

DESCRIPTION OF THE PREFERRED EMBODIMENTS

Figure 1:
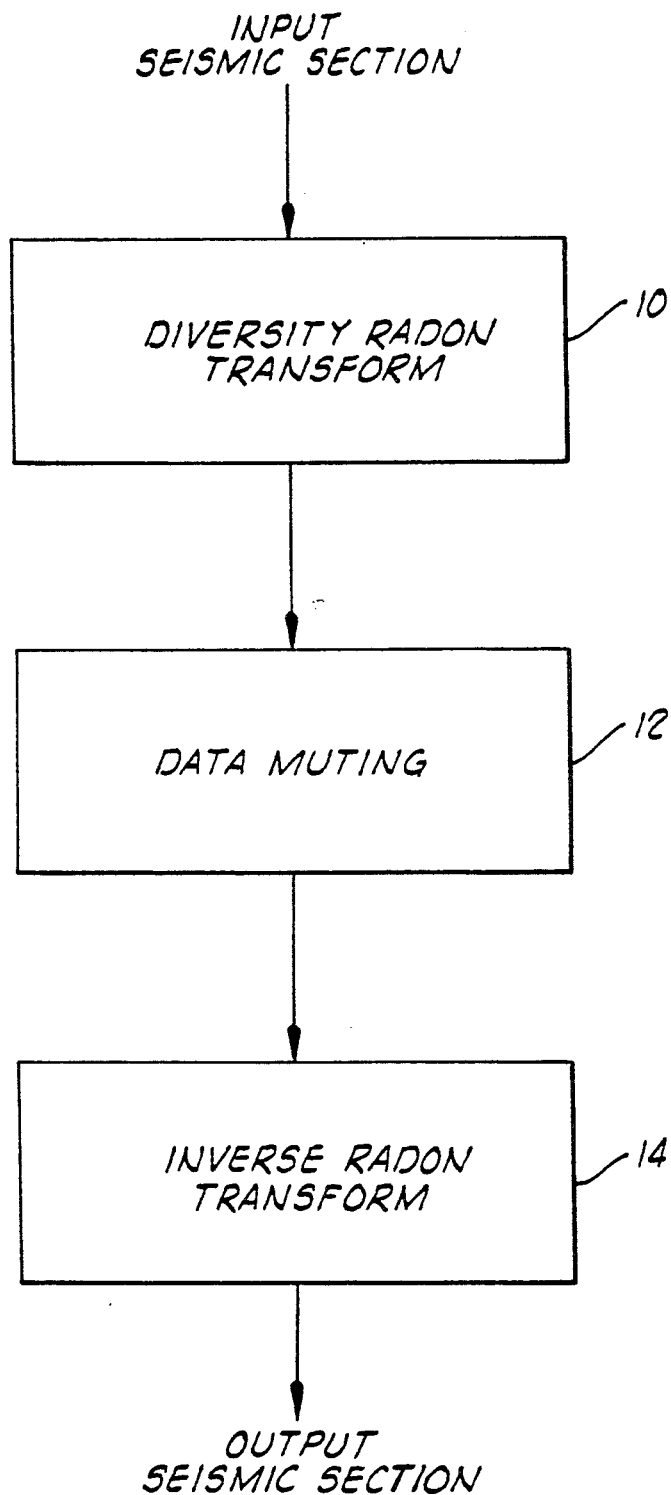
FIG. 1 is a flow diagram illustrating the steps of the present invention.

Referring now to the drawings in general and to FIG. 1 in particular, shown therein is the noise attenuation method of the present invention. Generally, the noise attenuation method of the present invention may be viewed as a three step process; (i) the diversity Radon transform step 10, (ii) the data muting step 12, and (iii) the inverse Radon transform step 14.

Seismic data, referred to in FIG. 1 as "Input Seismic Section", is input to the diversity Radon transform process 10. This process transforms the seismic data, which is in a first domain, preferably a time-space domain, to a Radon-transform domain. The Radon-transform domain may be time-slope, time-quadratic curvature, or time-hyperbolic curvature. The selection criteria for the particular domain is well known in the art and is generally dependent upon the specific seismic data being processed. For purposes of description herein, but not by way of limitation, the following discussion will assume a time-slope domain is selected. During the diversity Radon transformation, stacking (such as diversity stacking) or diversity summation is used to attenuate the incoherent noise while preserving the signal and the coherent noise.

The transformed data passes to the data muting process 12. In this process, the transform domain region in which the coherent noise exists is muted thus attenuating the coherent noise.

The muted data passes to the inverse Radon transform 14. In this process the data is transformed from the time-slope domain back to the time-distance domain using the inverse Radon transform without diversity summation. In the final output seismic section, coherent and incoherent noises are significantly attenuated.

Figure 2:
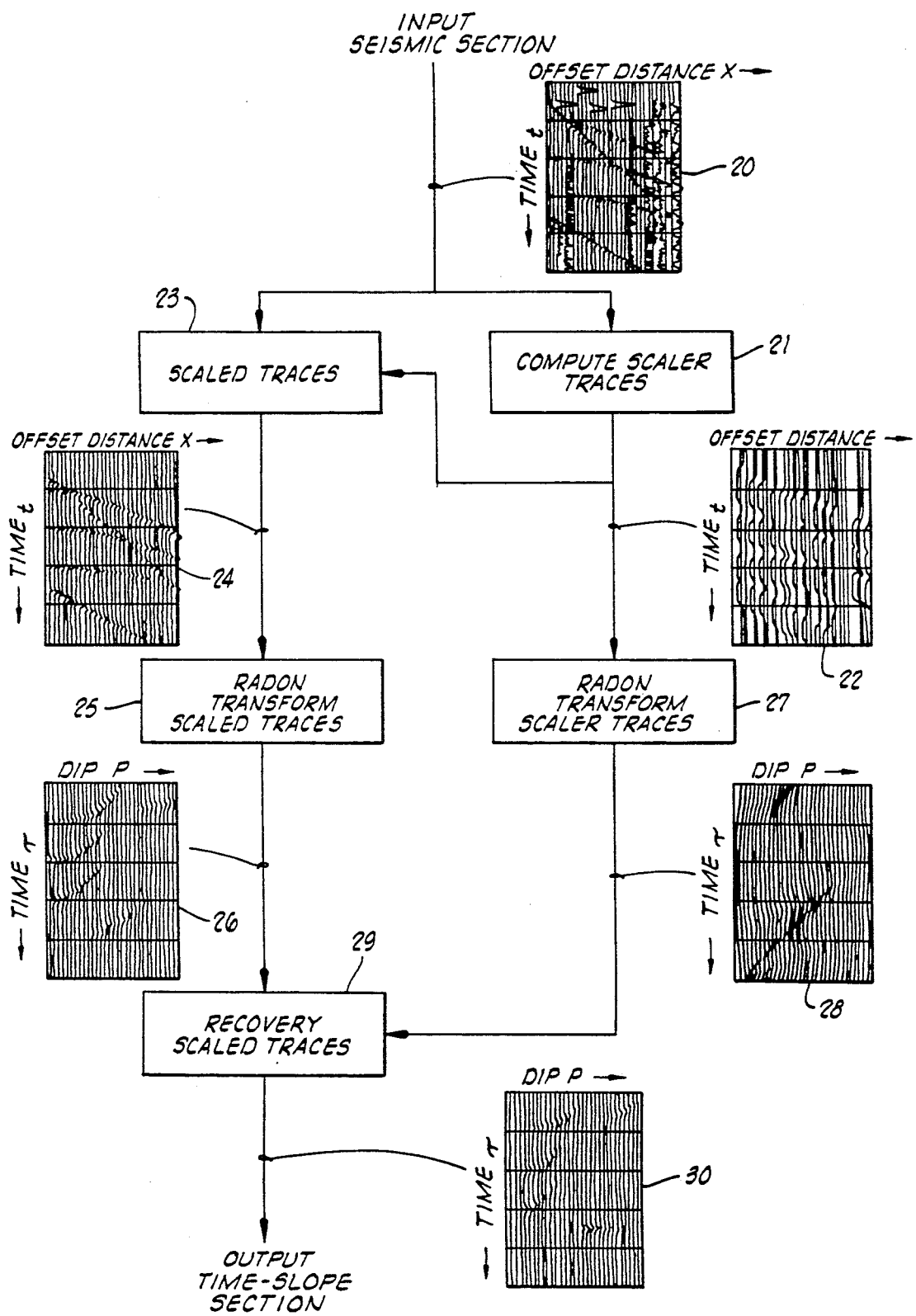
FIG. 2 is a flow diagram illustrating the steps of the diversity Radon process.
Figure 5:
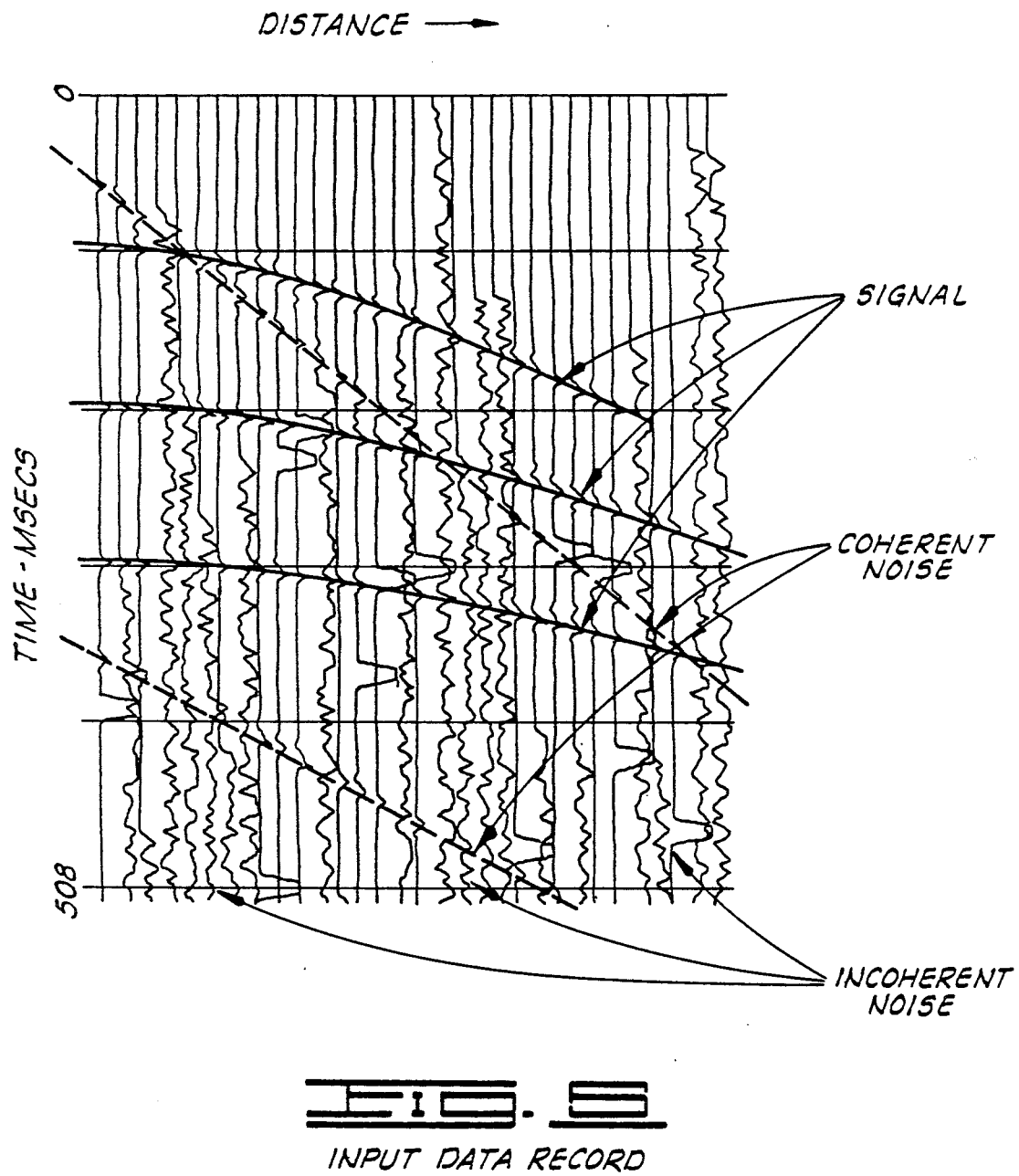
FIG. 5 illustrates an example of a noisy seismic input record.

Referring now to FIG. 2 (the diversity Radon transformation step), seismic data 20, consisting of seismic traces, are illustrated as a function of time and shot to receiver distance. The seismic data consist of signal components with hyperbolic curvature, coherent noise components with linear slopes, and incoherent noise components (FIG. 5). From these input traces, scaler traces are computed in block 21. The scaler traces S(t,x) are computed as the reciprocal of an amplitude function of the traces A(t,x)

$$S(t,x) = 1/(A(t,x) + c)$$

wherein t represents time and x represents a particular shot to receiver distance. Selecting the value of constant c from about 0.1% to about 10% and preferably 1% of the average value of A(t,x) computed for all points ensures that the scaler does not get too large when A(t,x) is small.

The amplitude function A(t,x) is typically a smooth time function of the power of the trace at location x. Other functions of the trace deflection may also be used. The smooth time function at x is typically obtained by computing the power of the trace at every time sample and then smoothing that function. Expected scaler traces are shown in diagram 22.

Once the scaler traces are computed, the input data is scaled by the scaler traces on a point by point basis in block 23 to produce scaled traces. Scaled traces are computed by multiplying the input data traces by the scaler traces. Expected scaled traces are shown in diagram 24. Both the scaled traces and the scaler traces are now identically Radon transformed to produce output traces in the time-slope domain. The Radon transformation of the scaled traces 24 and the scaler traces 22 occurs in blocks 25 and 27, respectively.

The Radon transformed trace for a given time slope p is computed by performing the following summation over all contributing traces:

$$RT(\tau, p) = \sum_{x} D(\tau + px, x)$$

wherein the output trace is represented by RT($\tau$,p), $\tau$ represents the time axis after transformation, p represents slope, px represents the time shift applied to the trace at x for the particular slope p, and x represents the shot to receiver distance of the contributing trace.

Each trace is time-advanced by px and the traces summed to produce the output trace RT($\tau$,p). The range of slopes p must be sufficient to cover the range of slopes on the input signal. In the example shown in FIG. 2, (reference numeral(s) 26, 28 and 30) the range of p's sufficiently covers the range required by the signal and the coherent noise. The increment $\Delta$p required to support all signals in the range of slopes p is given by:

$$\Delta p = 2\Delta T/(N-1)\Delta x$$

where
$\Delta T$ = time sample interval of data
$\Delta x$ = distance between traces
N = number of traces The expected result of performing the Radon transform on the scaled traces 24 and the scaler traces 22 are shown in diagrams 26 and 28 respectively.

In some instances, it is preferable to perform the summation in the Radon transform, at a given time $\tau$, over a lesser number of traces than those present in the input section. When the time-slope transform is used with events that have curvature, the traces in the summation should be restricted to those in the vicinity of the common tangent with an appropriate slope. This condition can always be satisfied by restricting the number of traces to be processed at each stage.

In other instances, as are readily appreciated by those skilled in the art, such as with a common depth point gather of traces, the appropriate number of traces to be processed may be calculated. This is so because with common depth point traces in the time/offset domain, the signals have hyperbolic curvature, with the shortest distance trace being close to the apex of the hyperbola. If an estimate of the curvature of the hyperbola is known as a function of time, then at each time, the aperture of traces that have signal sufficiently close to the common tangent can be computed.

The output time-slope section is processed in block 29. It is obtained by dividing the Radon transform of the scaled traces 26 by the Radon transform of the scaler trace 28 on a point by point basis. The expected output, illustrating significant attenuation of incoherent noise, is shown in diagram 30.

Figure 3:
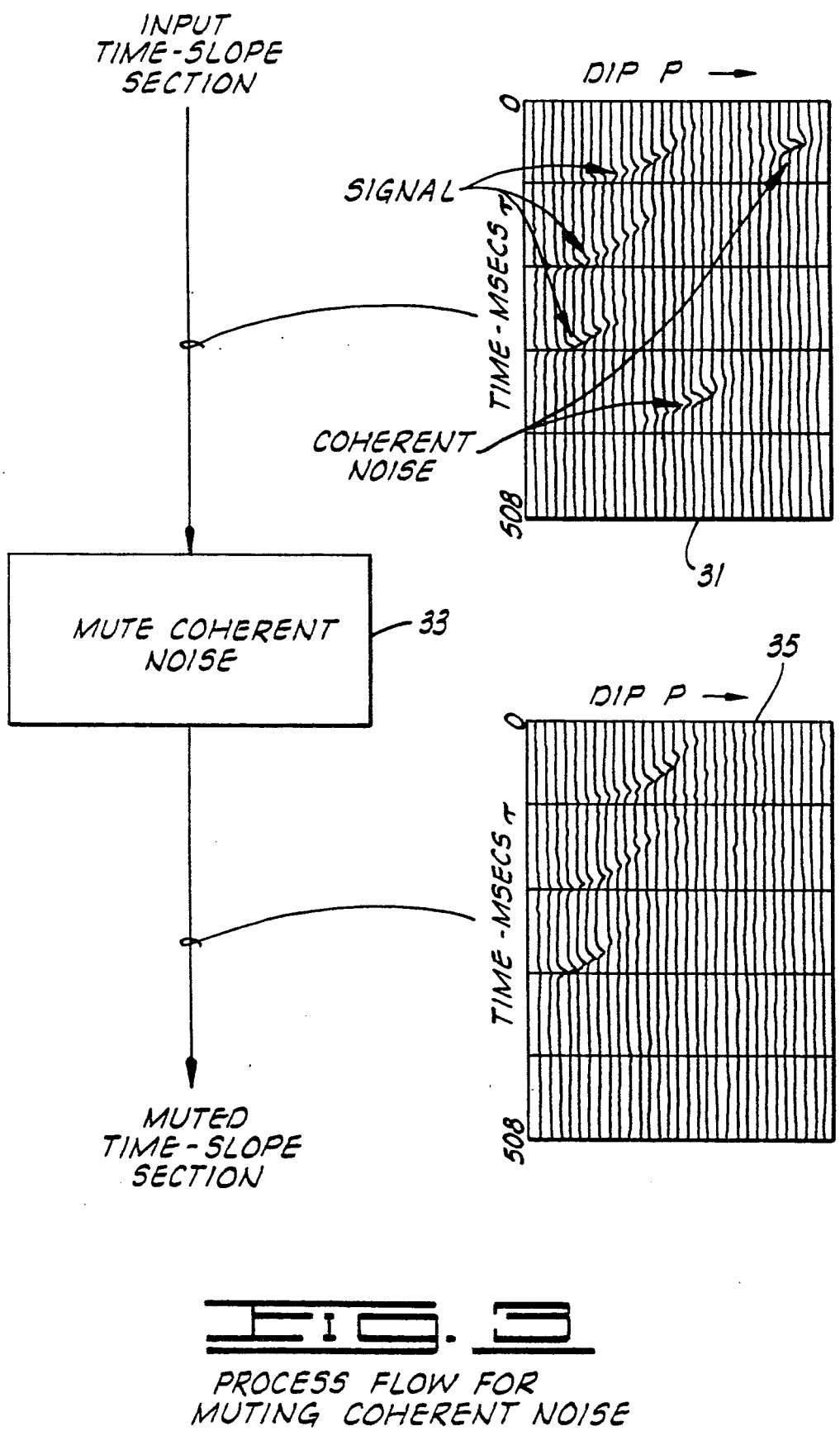
FIG. 3 is a flow diagram illustrating the steps involved in the process of muting coherent noise.

Referring now to FIG. 3, the second step of the present invention is data muting. The input time-slope section (the output time-slope section of FIG. 2) is shown in diagram 31. The signal components and the coherent noise components are identified.

In the coherent noise muting process, the energy in the region of the domain occupied by coherent noise is set to zero. The muted time-slop domain result is shown in diagram 35. Both the coherent and incoherent noises have now been attenuated.

Figure 4:
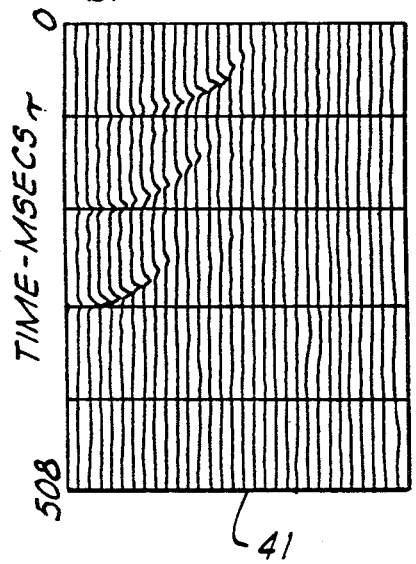
FIG. 4 is a flow diagram illustrating the steps involved in the inverse Radon transform process.
Figure 4:
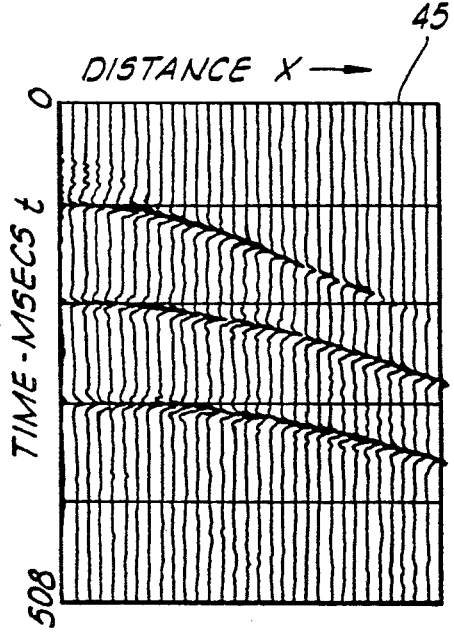

Referring now to FIG. 4, the third step of the present invention is the inverse Radon transform which converts the muted time-slope domain input data 41, back to preferably the first domain and more preferably to a time-space domain 45. The Radon transform process performed in block 43 generates the output data 45 (D(t,x)) from the input time-slope data 41 (RT(t,p)) according to the following relationship:

$$D(t, x) = \frac{\Sigma}{X} RT(t - px, p)$$

wherein t represents output time, x represents the shot to receiver distance of the output trace, px represents the time shift applied to the trace at p for a particular value of x, and p represents slope. The summation is over all of the p values.

Figure 6:
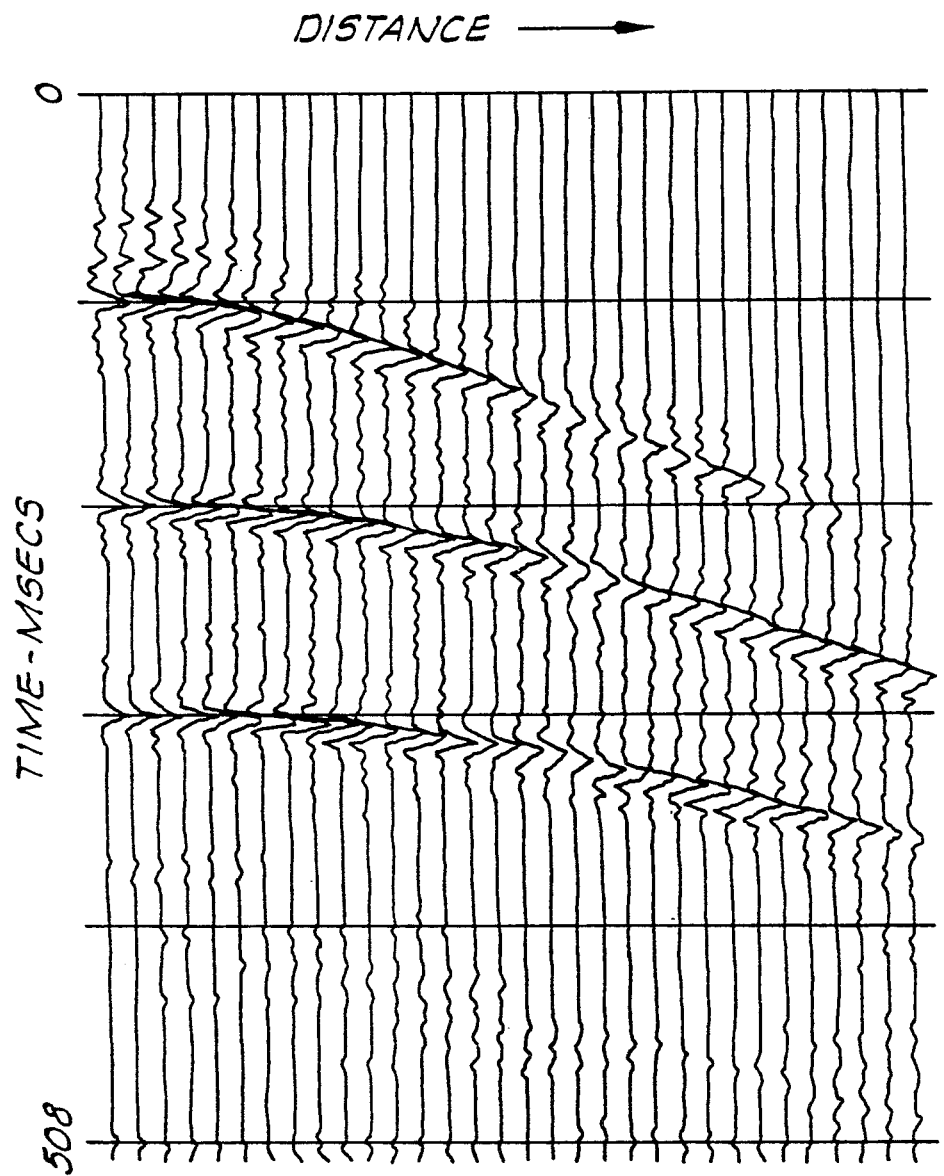
FIG. 6 illustrates an expected output record after attenuation of the coherent and incoherent noise in FIG. 5 by the method of the present invention.

A more detailed diagram of a noisy record identifying the signal, coherent noise and incoherent noise is shown in FIG. 5. The expected attenuation of coherent and incoherent noises after processing the record of FIG. 5 according to the method of the present invention is shown in FIG. 6.

Referring now to FIGS. 7a and 7b, the method of the present invention may be extended to include the processing of multiple adjacent data records. Reflections from subsurface phenomena will have linear or curved continuity, not only in the shot-receiver offset domain, but also from shot location to shot location (FIG. 7a). For example, the local planar character of these reflection can be exploited by utilizing a two dimensional diversity power Radon transform to transform the data into the domain of shot slope and shot-receiver slope (FIG. 7b). The use of the diversity summation process over the input domains of shot-receiver distance and shot-shot distance will provide further attenuation of incoherent noise. Coherent noise that is manifest as linear dipping phenomena in the shot-receiver domain and the shot-shot distance domain may also be muted.

While the preferred embodiments of the present invention have been described herein, changes or modifications in the method may be made by an individual skilled in the art without departing from the spirit and scope of the invention set forth in the appended claims.

What is claimed is:

1. A method of attenuating coherent and incoherent noise in data in a first domain comprising the steps of:
    transforming the data using a diversity Radon transform from the first domain to a Radon-transform domain, wherein the transforming step further comprises the steps of:
    (a) determining scaler data;
    (b) multiplying the data by the scaler data to produce scaled data;
    (c) transforming the scaler data and the scaled data into the Radon transform domain; and
    (d) dividing the transformed scaled data by the transformed scaler data; and
    attenuating the coherent and incoherent noise in data in the Radon-transform domain.

2. The method of claim 1 wherein the first domain is further defined as a time-space domain.

3. The method of claim 1 further comprising the step transforming the product of the second step of claim 1 back to the first domain by using an inverse Radon transform.

4. The method of claim 1 in which the Radon-transform domain is a time-quadratic curvature domain.

5. The method of claim 1 in which the Radon-transform domain is a time-hyperbolic curvature domain.

6. The method of claim 1 in which the Radon-transform domain is a time-slop domain.

7. The method of claim 1 wherein the diversity Radon transform is a power diversity Radon transform.

8. The method of claim 1 wherein the diversity Radon transform is a data amplitude diversity Radon transform.

9. The method of claim 1 wherein the step of attenuating coherent noise comprises muting.

10. The method of claim 1 wherein the step of attenuating incoherent noise comprises diversity stacking.

11. The method of claim 1 wherein the diversity Radon transform is applied in two dimensions using multiple adjacent data.

12. A method of attenuating coherent and incoherent noise in data in a first domain comprising the steps of:
    transforming the data using a diversity Radon transform from the first domain to a Radon-transform domain, wherein the transforming step further comprises the steps of:
    (a) determining scaler data;
    (b) multiplying the data by the scaler data to produce scaled data;
    (c) transforming the scaler data and the scaled data into the Radon transform domain; and
    (d) dividing the transformed scaled data by the transformed scaler data;
    attenuating the coherent and incoherent noise in data in the Radon-transform domain; and
    transforming the data of the attenuating step back to the first domain.

13. The method of claim 12 wherein the first domain is further defined as a time-space domain.

14. The method of claim 12 wherein an inverse Radon-transform is used in the third step.

15. The method of claim 12 wherein the Radon-transform domain is a time-quadratic curvature domain.

16. The method of claim 12 wherein the Radon-transform domain is a time-hyperbolic curvature domain.

17. The method of claim 12 wherein the Radon-transform domain is a time-slope domain.

18. The method of claim 12 wherein the diversity Radon transform is a power diversity Radon transform.

19. The method of claim 12 wherein the diversity Radon transform is a data amplitude diversity Radon transform.

* * * * *